(12) United States Patent
Gherman et al.

(10) Patent No.: US 8,793,242 B2
(45) Date of Patent: *Jul. 29, 2014

(54) DERIVING DOCUMENT SIMILARITY INDICES

(71) Applicant: Microsoft Corporation, Redmond, WA (US)

(72) Inventors: Sorin Gherman, Kirkland, WA (US); Kunal Mukerjee, Redmond, WA (US); Adam Prout, Kirland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/922,168

(22) Filed: Jun. 19, 2013

(65) Prior Publication Data

US 2013/0282730 A1    Oct. 24, 2013

Related U.S. Application Data

(63) Continuation of application No. 12/970,650, filed on Dec. 16, 2010, now Pat. No. 8,478,740.

(51) Int. Cl.
*G06F 17/30*    (2006.01)

(52) U.S. Cl.
CPC .... *G06F 17/30011* (2013.01); *G06F 17/30017* (2013.01); *G06F 17/3002* (2013.01)
USPC ............ 707/715; 707/673; 707/711; 707/769

(58) Field of Classification Search
CPC ............... G06F 17/30011; G06F 17/30017; G06F 17/3002
USPC ................... 707/673, 711, 715, 769
See application file for complete search history.

(56) References Cited

U.S. PATENT DOCUMENTS

| | | | |
|---|---|---|---|
| 5,418,951 | A | 5/1995 | Damashek |
| 5,724,538 | A | 3/1998 | Morris et al. |
| 5,924,096 | A | 7/1999 | Draper et al. |
| 5,963,205 | A | 10/1999 | Sotomayor |
| 6,070,158 | A | 5/2000 | Kirsch |
| 6,132,831 | A | 10/2000 | Thomas-Cote |
| 6,360,215 | B1 | 3/2002 | Judd et al. |
| 6,393,544 | B1 | 5/2002 | Bryg et al. |

(Continued)

FOREIGN PATENT DOCUMENTS

| | | |
|---|---|---|
| CN | 1637744 | 7/2005 |
| CN | 1694100 | 11/2005 |
| CN | 1716294 | 1/2006 |

OTHER PUBLICATIONS

Lopez, Fernando Azpeita, "SQL Server 2008 Full-Text Search: Internals and Enhancements", Jul. 2008, 27 pages.

(Continued)

*Primary Examiner* — Frantz Coby
(74) *Attorney, Agent, or Firm* — Nicholas Chen; Brian Haslam; Micky Minhas (57) ABSTRACT

Methods, systems, and computer program products are provided for deriving and updating document similarity indices for a plurality of documents. The number of maintained similarities can be controlled to conserve CPU and storage resources.

20 Claims, 7 Drawing Sheets

(56) References Cited

U.S. PATENT DOCUMENTS

| | | |
|---|---|---|
| 6,421,656 B1 | 7/2002 | Cheng et al. |
| 6,694,484 B1 | 2/2004 | Mueller |
| 7,047,491 B2 | 5/2006 | Schubert et al. |
| 7,590,645 B2 | 9/2009 | Nayak |
| 7,620,624 B2 | 11/2009 | Stata |
| 7,636,732 B1 | 12/2009 | Nielsen |
| 7,702,640 B1 | 4/2010 | Vermeulen et al. |
| 7,730,069 B2 | 6/2010 | Yamamoto |
| 8,478,740 B2 * | 7/2013 | Gherman et al. ............. 707/715 |
| 2002/0069230 A1 | 6/2002 | Schubert et al. |
| 2002/0122543 A1 | 9/2002 | Rowen |
| 2006/0173707 A1 | 8/2006 | Schubert et al. |
| 2007/0203908 A1 | 8/2007 | Wang et al. |
| 2009/0327213 A1 | 12/2009 | Choudhary |
| 2010/0030799 A1 | 2/2010 | Parker et al. |

OTHER PUBLICATIONS

Teregowda, Pradeep B., et al., "SeerSuite: Developing a Scalable and Reliable Application Framework for Building Digital Libraries by Crawling the Web", 2010, 12 pages. (The month of Publication is irrelevant since the year of Publication is clearly prior to the filing of the Application).

Muller, Christof, et al., "A Study on the Sernantic Relatedness of Query and Document Terms in Information Retrieval", Aug. 6, 2009, pp. 1338-1347.

He Jinru, et al., "Compact Full-Text Indexing of Versioned Document Collections", Nov. 2, 2009, 10 pages.

Bennett, Mark, "Contrasting Relational Database and Full-Text Search Engines", Jun. 2004, 5 pages.

Blei, David M., et al., "Latent Dirichlet Allocation", Jan. 2003, pp. 993-1022.

U.S. Appl. No. 12/970,650, Oct. 18, 2012, Office Action.

U.S. Appl. No. 12/970,650, Mar. 12, 2013, Notice of Allowance.

* cited by examiner

DERIVING DOCUMENT SIMILARITY INDICES

CROSS-REFERENCE TO RELATED APPLICATIONS

This application is a continuation of U.S. patent application Ser. No. 12/970,650 filed on Dec. 16, 2010, entitled "DERIVING DOCUMENT SIMILARITY INDICES," which issued as U.S. Pat. No. 8,478,740 on Jul. 2, 2013, and which application is expressly incorporated herein by reference in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

For many organizations, documents easily comprise the largest information assets by volume. As such, characterizing a document by its salient features, such as, for example, its key words and phrases, is an important piece of functionality.

One technique for characterizing documents includes using full text search solutions that mine documents into full text inverted indices. Another technique for characterizing documents mines document level semantics (e.g., to identify similarities between documents). In some embodiments, term similarity and/or document similarity are compute via compute intensive algorithms, such as, for example, Latent Semantic Indexing ("LSI") and Latent Direchlet Allocation ("LDA").

LSI is an indexing and retrieval method that uses a mathematical technique called Singular Value Decomposition ("SVD") to identify patterns in the relationships between the terms and concepts contained in an unstructured collection of text. LSI is based on the principle that words that are used in the same contexts tend to have similar meanings. One feature of LSI is its ability to extract the conceptual content of a body of text by establishing associations between those terms that occur in similar context.

LDA is a generative model that allows sets of observations to be explained by unobserved groups which explain why some parts of the data are similar. For example, if observations are words collected into documents, it posits that each document is a mixture of a small number of topics and that each word's creation is attributable to one of the document's topics.

However, proper implementation of full text search and document similarity techniques can require heavy investments in both computer hardware and personnel resources. Further, document parsing, mining, etc. operations are often replicated across these two techniques. As such, an end user pays additional costs by having to invest in (perhaps as much as double) resources to reap the benefits of both search and semantic insight over their documents. Additionally, many more complex document mining techniques require integrating disparate systems together and lead to further costs in order to satisfy an organization's document processing needs.

BRIEF SUMMARY

The present invention extends to methods, systems, and computer program products for deriving document similarity indices. Embodiments of the invention include deriving a document similarity index for a plurality of documents. A document is accessed. A tag index is computed for the document. The tag index includes one more keyword/weight pairs. Each keyword/weight pair maps a keyword to a corresponding weight for the keyword to indicate the significance of the keyword within the document. A specified number of the most significant keywords in the document are identified based on weights in the tag index.

For each keyword in the specified number of the most significant keywords, the corresponding weight of the keyword is determined from within each document in the plurality of documents. A plurality of candidate documents, from among the plurality of documents, is identified based on the corresponding weights of the specified number of the most significant keywords in the plurality of documents. At least some of the specified number of the most significant keywords in the document also being significant keywords in each of the plurality of candidate documents.

For each candidate document in the plurality of candidate documents, a full similarity between the document and candidate document is calculated by determining the weight of additional keywords from the document within the candidate document. Full similarities for a prescribed number of a candidate documents are selected for inclusion in the document similarity index to indicate documents that are similar to the document. Selection of the full similarities for the prescribed number of candidate documents is based on the full similarity calculations and in accordance with one of a hard limit or an express threshold. The hard limit or the express threshold limits the number of candidate documents that can be selected for inclusion in the document similarity index. For each candidate document included in the prescribed number of candidate documents, information from the full similarity between the document and the candidate document is stored in the document similarly index.

Other embodiments of the invention include updating a document similarity index for a plurality of documents. A batch of documents is accessed. For each document in the batch of documents, a tag index is computed for the document. The tag index includes one more keyword/weight pairs. Each keyword/weight pair maps a keyword to a corresponding weight for the keyword to indicate the significance of the keyword within the document.

For each document in the batch of documents subsequent to computing the tag indices, a specified number of the most significant keywords in the document are identified based on weights in the tag index. For each keyword in the specified number of the most significant keywords, the corresponding weight of the keyword is determined from within each document in the plurality of documents and in document the batch of documents. A plurality of candidate documents, from among the plurality of documents and the batch of documents, is identified. The plurality of candidature documents is identified based on the corresponding weights of the specified number of the most significant keywords in the plurality of documents and in the batch of documents. At least some of the specified number of the most significant keywords in the document is also significant keywords in each of the plurality of candidate documents.

For any candidate documents identified from within the plurality of documents, a full similarity between the document and candidate document is identified by determining the weight of additional keywords from the document within the candidate document. The weakest similarity, from among a specified number of top similarities, is identified for the candidate document from within the document similarity index. The weakest similarity indicates the similarity between the candidate document and another document in the plurality of documents.

It is determined that the candidate document and the document are more similar than the candidate document and the other document by comparing the calculated full similarity to the identified weakest similarity. The weakest similarly is replaced with information from the calculated full similarity within the document similarity index, the replacement based on the determination; and For any candidate documents identified from within the batch of documents, a full similarity between the document and candidate document is identified by determining the weight of additional keywords from the document within the candidate document. A prescribed number of candidate documents are selected for inclusion in the document similarity index as documents that are similar to the document. The selection of the prescribed number of candidate documents is based on the full similarity calculations and in accordance with one of a hard limit or an express threshold. The hard limit or the express threshold limits the number of candidate documents that can be selected for inclusion in the document similarity index. Information from the calculated full similarity between the document and the candidate document is stored in the document similarly index.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for deriving document similarity indices. Embodiments of the invention include deriving a document similarity index for a plurality of documents. A document is accessed. A tag index is computed for the document. The tag index includes one more keyword/weight pairs. Each keyword/weight pair maps a keyword to a corresponding weight for the keyword to indicate the significance of the keyword within the document. A specified number of the most significant keywords in the document are identified based on weights in the tag index.

For each keyword in the specified number of the most significant keywords, the corresponding weight of the keyword is determined from within each document in the plurality of documents. A plurality of candidate documents, from among the plurality of documents, is identified based on the corresponding weights of the specified number of the most significant keywords in the plurality of documents. At least some of the specified number of the most significant keywords in the document also being significant keywords in each of the plurality of candidate documents.

For each candidate document in the plurality of candidate documents, a full similarity between the document and candidate document is calculated by determining the weight of additional keywords from the document within the candidate document. Full similarities for a prescribed number of a candidate documents are selected for inclusion in the document similarity index to indicate documents that are similar to the document. Selection of the full similarities for the prescribed number of candidate documents is based on the full similarity calculations and in accordance with one of a hard limit or an express threshold. The hard limit or the express threshold limits the number of candidate documents that can be selected for inclusion in the document similarity index. For each candidate document included in the prescribed number of candidate documents, information from the full similarity between the document and the candidate document is stored in the document similarly index.

Other embodiments of the invention include updating a document similarity index for a plurality of documents. A batch of documents is accessed. For each document in the batch of documents, a tag index is computed for the document. The tag index includes one more keyword/weight pairs. Each keyword/weight pair maps a keyword to a corresponding weight for the keyword to indicate the significance of the keyword within the document.

For each document in the batch of documents subsequent to computing the tag indices, a specified number of the most significant keywords in the document are identified based on weights in the tag index. For each keyword in the specified number of the most significant keywords, the corresponding weight of the keyword is determined from within each document in the plurality of documents and in document the batch of documents. A plurality of candidate documents, from among the plurality of documents and the batch of documents, is identified. The plurality of candidature documents is identified based on the corresponding weights of the specified number of the most significant keywords in the plurality of documents and in the batch of documents. At least some of the specified number of the most significant keywords in the document is also significant keywords in each of the plurality of candidate documents.

For any candidate documents identified from within the plurality of documents, a full similarity between the document and candidate document is identified by determining the weight of additional keywords from the document within the candidate document. The weakest similarity, from among a specified number of top similarities, is identified for the candidate document from within the document similarity index. The weakest similarity indicates the similarity between the candidate document and another document in the plurality of documents.

It is determined that the candidate document and the document are more similar than the candidate document and the other document by comparing the calculated full similarity to the identified weakest similarity. The weakest similarly is replaced with information from the calculated full similarity within the document similarity index, the replacement based on the determination; and For any candidate documents identified from within the batch of documents, a full similarity between the document and candidate document is identified by determining the weight of additional keywords from the document within the candidate document. A prescribed number of candidate documents are selected for inclusion in the document similarity index as documents that are similar to the document. The selection of the prescribed number of candidate documents is based on the full similarity calculations and in accordance with one of a hard limit or an express threshold. The hard limit or the express threshold limits the number of candidate documents that can be selected for inclusion in the document similarity index. Information from the calculated full similarity between the document and the candidate document is stored in the document similarly index.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, DVD, or other optical disk storage, magnetic disk storage or other magnetic storage devices, or any other medium which can be used to store desired program code means (software) in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
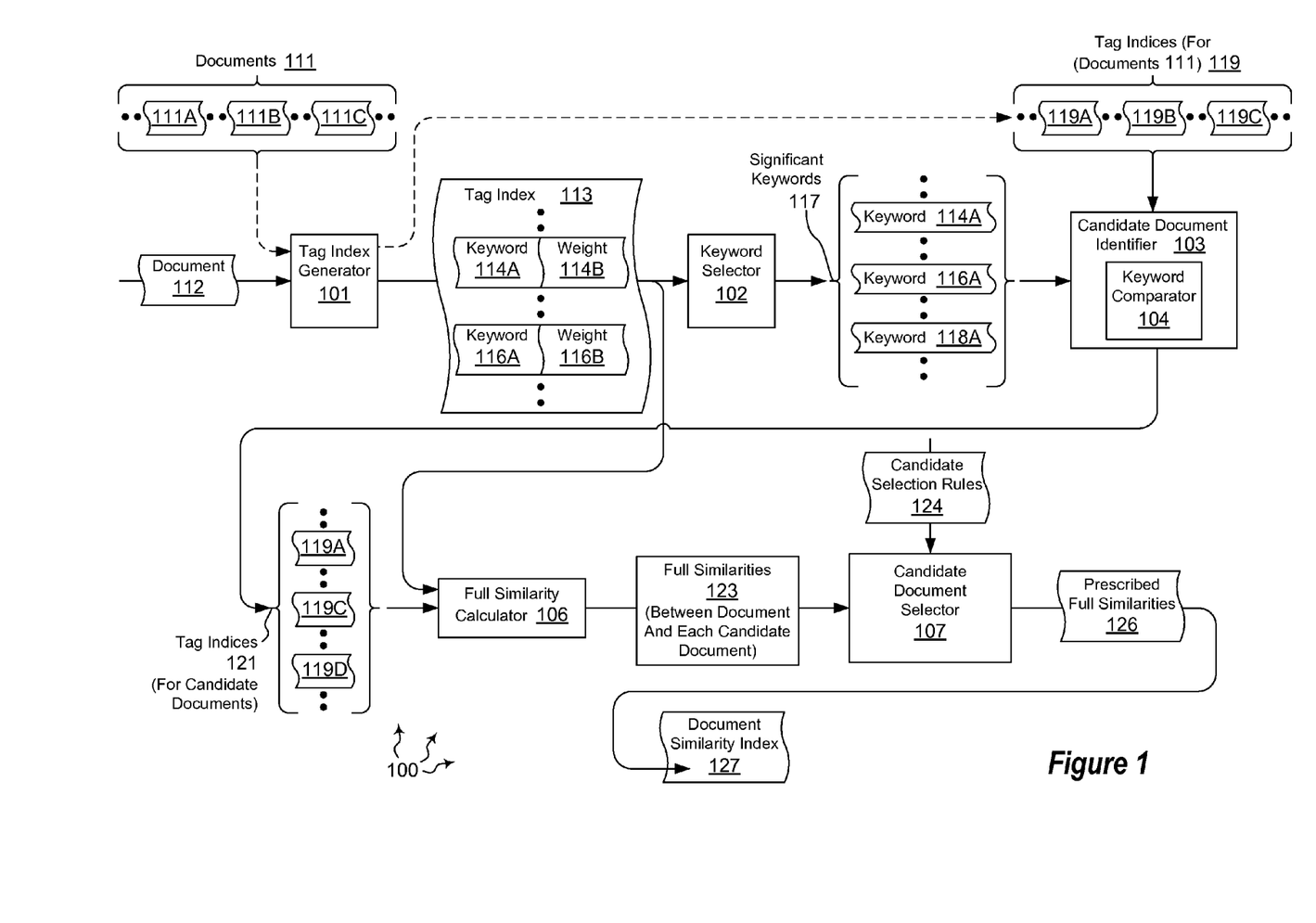
FIG. 1 illustrates an example computer architecture that facilitates deriving a document similarity index.

Embodiments of the invention can be used to derive a document similarity index. FIG. 1 illustrates an example computer architecture 100 that facilitates deriving a document similarity index. Referring to FIG. 1, computer architecture 100 includes tag index generator 101, keyword selector 102, candidate document identifier 103, full similarity calculator 106, and candidate document selector 107. Each of the depicted components can be connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, tag index generator 101 is configured to receive a document and generate a tag index for the document. A tag index includes one or more keyword/weight pairs that map a keyword from a document to a corresponding weight for the keyword within the document. A keyword can be word of a written language (e.g., English, Japanese, German, etc.). The weight indicates the significance of the keyword within the document.

Various different types of free parameters, such as, for example, term frequency, document length, etc, can be used in weight functions to generate weight values included in a tag index and in selection/threshold functions used to select a tag from within a tag index Functional forms for weighting and selection/threshold functions can be selected arbitrarily. For example, some possible types of functions include:

| Functional form | Example |
| --- | --- |
| Linear | $f(.) = ax1 + bx2 + c$ |
| Polynomial | $f(.) = ax1^n + bx2^{n-1}$ |
| Ratio | $f(.) = ax1^n/bx2^m$ |
| Exponential | $2^{f(.)}, e^{f(.)}$ |

Keyword selector 102 is configured to receive a tag index and extract a number of significant keywords from the tag index. Significant keywords can be selected based on weight. The number of significant keywords selected can be based on a limit or threshold Candidate document identifier 103 is configured to identify candidate documents for inclusion in a document similarity index as being similar to another document. Candidate documents can be identified based on keywords. Keyword comparator 104 can compare significant keywords from a document to tag indexes from a plurality of other documents. When significant keywords from one document are also more heavily weighted in the tag index for another document there is at least some potential for the one document to be similar to the other document. Candidate document identifier 103 can output a set of tags indices for a corresponding set of candidate documents that have potential similarities to another document.

Full similarity calculator 106 is configured to calculate full similarities between a document and each document in a set of potentially similar candidate documents. Full similarity can be calculated from the tag index for the document and the tag from each potentially similar candidate document. Thus, a top number of significant keywords from a document can be used to identify potentially similar candidate documents and then the full tag index for the document can be used to calculate full similarities between the document and each of the potentially similar candidate documents.

Candidate document selector 107 is configured to select full similarities for a prescribed number of candidate documents for inclusion in a document similarity index. Candidate document selector 107 select full similarities for inclusion in the document similarity index in accordance with candidate selection rules 124. Candidate selection rules 124 can include a hard limit or express threshold that limits the number of candidate documents that can be selected for inclusion in the document similarity index. Information from selected document similarities can be stored in the document similarity index to indicate similarities between documents (e.g., that two documents contain a number of the same words or phrases).

Figure 2:
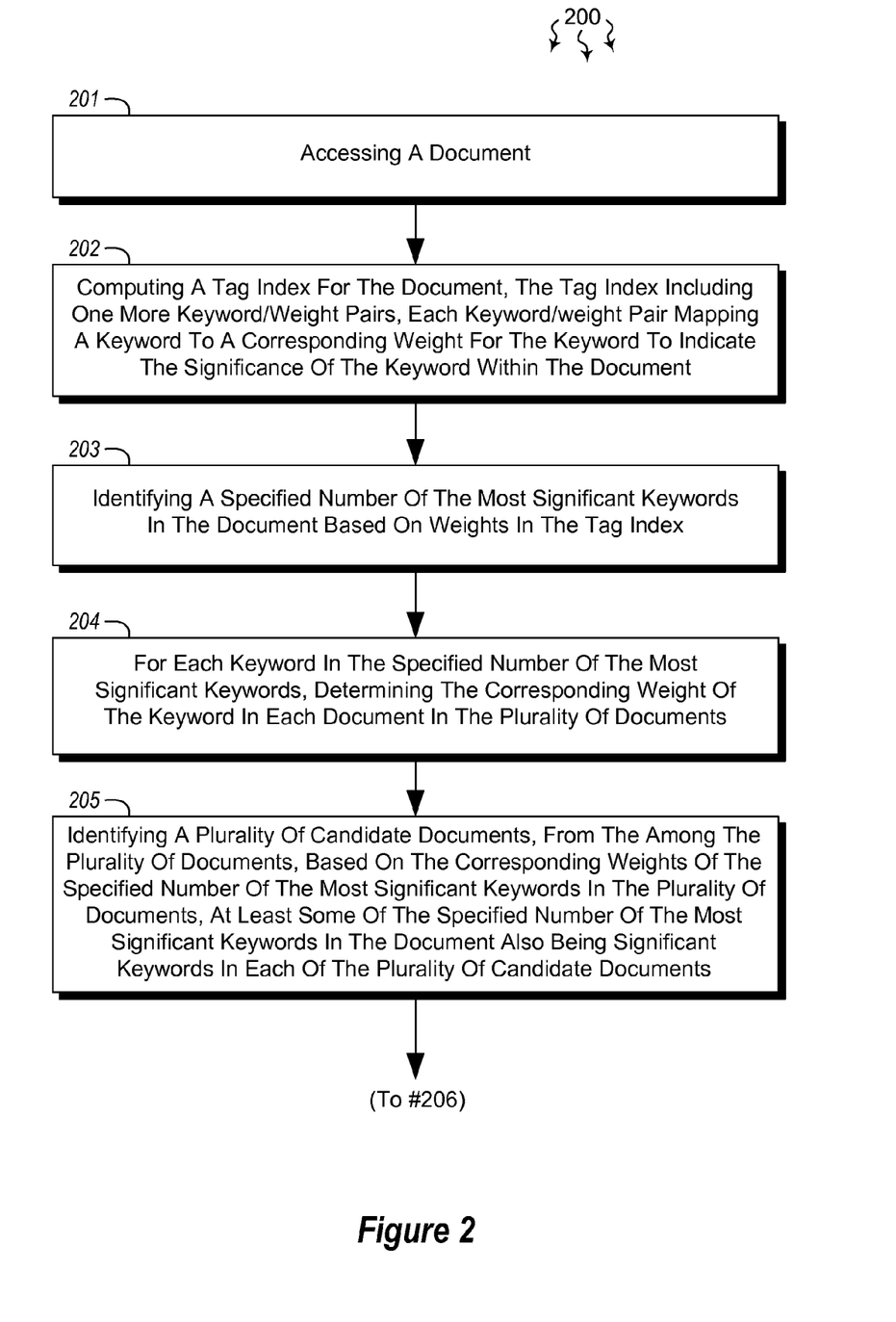
FIG. 2 illustrates a flow chart of an example method for deriving a document similarity index.

FIG. 2 illustrates a flow chart of an example method 200 for deriving a document similarity index. Method 200 will be described with respect to the components and data of computer architecture 100.

Method 200 includes an act of accessing a document (act 201). For example, tag index generator 101 can access document 112 (e.g., a document in a written language). Method 200 includes an act computing a tag index for the document, the tag index including one more keyword/weight pairs, each keyword/weight pair mapping a keyword to a corresponding weight for the keyword to indicate the significance of the keyword within the document (act 202). For example, tag index generator 101 can generate tag index 113 for document 112. Tag index 113 includes keyword/weight pairs, such as, for example keyword 114A/weight 114B, keyword 116A/weights 116B, etc, indicating the significance of each keyword 114A, keyword 114B, etc. within document 112.

Method 200 includes an act of identifying a specified number of the most significant keywords in the document based on weights in the tag index (act 203). For example, keyword selector 102 can access tag index 113. Keyword selector 102 can identify significant keywords 117 contained in document 112 (including keywords 114A, 116A, and 118A) based on weights in tag index 113. For example, weights 114B, 116B, etc. can indicate that keywords 114A, 116A, etc. are more significant in document 112. Keyword selector 102 can be configured to select a specified number of (e.g., a top ten) significant keywords from a document.

Method 200 includes, for each keyword in the specified number of the most significant keywords, an act of determining the corresponding weight of the keyword in each document in the plurality of documents (act 204). Candidate document identifier 103 can receive significant keywords 117 and tag indices 119 (for documents 111). Each tag index in tag indices 119 can correspond to a document in documents 111. For example, tag index 119A corresponds to document 111A, tag index 119B corresponds to document 111B, tag index 119C corresponds to document 111C, etc. Tag index generator 102 can be used to generate tag indices 119 for documents 111. Thus, the format of each tag index in tag indices 119 can be of the format of tag index 113.

For each keyword in significant keywords 117, candidate document identifier 103 can scan tag indices 119 for the keyword. For any tag indices that include the keyword, the weight of the keyword within the corresponding document can be temporarily saved. For example, if keyword 114A is found in tag index 119A, the weight for the keyword 114A within document 111A can be temporarily saved.

Method 200 includes an act of identifying a plurality of candidate documents, from the among the plurality of documents, based on the corresponding weights of the specified number of the most significant keywords in the plurality of documents, at least some of the specified number of the most significant keywords in the document also being significant keywords in each of the plurality of candidate documents (act 205). Candidate document identifier 103 can identify documents (from documents 111) corresponding to tag indices 121 (a subset of tag indices 119 as candidate documents that are potentially similar to document 112. For example, candidate document identifier 103 can identify document 111A corresponding to tag index 119A as potentially similar to document 112. Similarly, candidate document identifier 103 can identify document 111C corresponding to tag index 119C as potentially similar to document 112. Likewise, candidate document identifier 103 can identify some other document (from documents 111) corresponding to tag index 119C as potentially similar to document 112. At least some of significant keywords 117 are also included in each of the candidate documents, 111A, 111C, etc.

To identify candidate documents that are potentially similar to document 112, keyword comparator 104 can compare the keyword weights for each keyword found in each document to one another. Different algorithms can be used to identify candidates, the algorithms can be based on how many of significant keywords 117 are contained in a document and what the weight of each significant keyword is in the document. Thus, a document containing a greater number of significant keywords 117 that have less significance in the document can be identified as a candidate document. Similarly, a document containing a fewer number of significant keywords 117 that have greater significance in the document can also be identified as a candidate document.

Method 200 includes an act of for each candidate document in the plurality of candidate documents, an act of calculating a full similarity between the document and candidate document by determining the weight of additional keywords from the document within the candidate document (act 206). For example, full similarity calculator 102 can access tag index 113 and tag indices 122. Full similarity calculator 102 can calculate full similarities 123. Full similarities 123 can indicate a full similarity between document 112 and each document corresponding to a tag index in tag indices 121.

For example, full similarities 123 can indicate a full similarity between document 112 and document 111A based on keywords (in addition to significant keywords 117) and weights in tag indices 113 and 119A. Likewise, full similarities 123 can indicate a full similarity between document 112 and document 111C based on keywords (in addition to significant keywords 117) and weights in tag indices 113 and 119C. Full similarities between document 112 and other documents can also be indicated based on keywords and weights tag index 113 and other corresponding tag indices.

Method 200 includes an act of selecting full similarities for a prescribed number of a candidate documents for inclusion in the document similarity index to indicate documents that are similar to the document, selection of the full similarities for the prescribed number of candidate documents based on the full similarity calculations and in accordance with one of a hard limit or an express threshold, the hard limit or the express threshold limiting the number of candidate documents that can be selected for inclusion in the document similarity index (act 207). For example, candidate document selector 107 can select prescribed full similarities 126 for inclusion in document similarity index 127. Prescribed similarities 126 includes full similarities between document 112 and a reduced subset of candidate documents represented in full similarities 123. Candidate document selector 107 can select prescribed full similarities 126 based on full similarities 123 and in accordance with hard limits or express thresholds in candidate selection rules 124. The hard limits or express thresholds limit the number of full similarities from full similarities 123 that can be included in prescribed full similarities 126. For example, a hard limit can limit the number of full similarities that can be include in prescribed full similarities to 10 or less.

Method 200 includes for each candidate document included in the prescribed number of candidate documents, an act of storing information from the full similarity between the document and the candidate document in the document similarly index (act 208). For example, for each candidate document represented in prescribed full similarities 126, information from the similarity between document 112 and the candidate document can be stored in document similarity index 127. For example, information from tag index 113 and tag index 119A can be stored in document similarity index 127 to indicate that documents 112 and 111A are similar.

Figure 3:
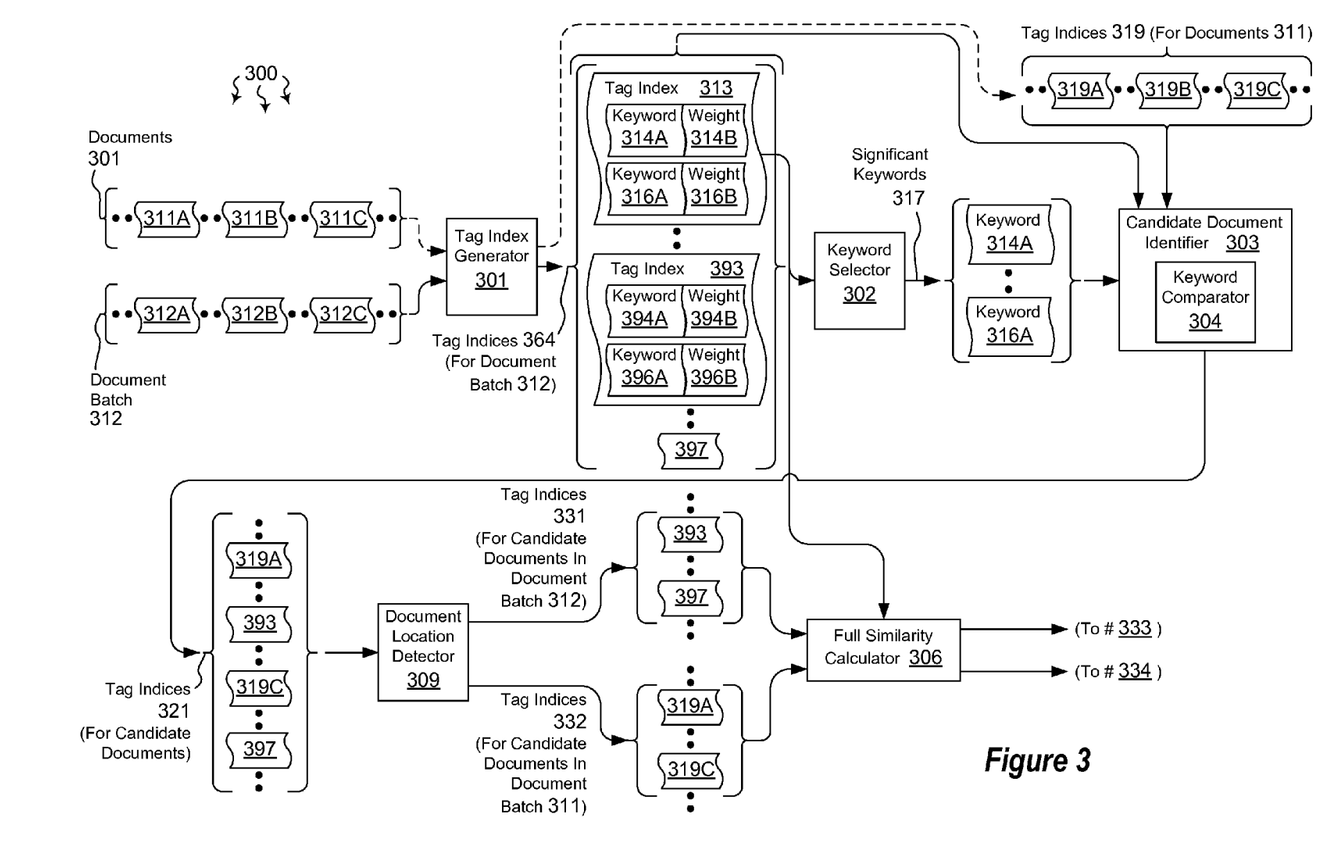
FIG. 3 illustrates an example computer architecture that facilitates updating a document similarity index.

Embodiments of the invention can also be used to update a document similarity index. FIG. 3 illustrates an example computer architecture 300 that facilitates deriving a document similarity index. Referring to FIG. 3, computer architecture 300 includes tag index generator 301, keyword selector 302, candidate document identifier 303, full similarity calculator 306, candidate document selector 307, document location detector 309, and similarity comparator 374. Each of the depicted components can be connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Like named components can function similar to corresponding components in computer architecture 100. For example, tag index generator 301, keyword selector 302, candidate document identifier 303, full similarity calculator 306, candidate document selector 307 can function similar to tag index generator 101, keyword selector 102, candidate document identifier 103, full similarity calculator 106, and candidate document selector 107 respectively.

Document location detector 309 is configured to determine the location where a document originated (e.g., what batch of documents) from a tag index for the document.

Similarity comparator 374 is configured to compare different similarities to one another to determine which similarity is the strongest (more similar) and/or weakest (less similar). For example, similarity comparator 309 can compare a similarity between a first document and a second document to a similarity between the first document and third document to determine if the first document is more similar to the second document or the third document.

Figure 4:
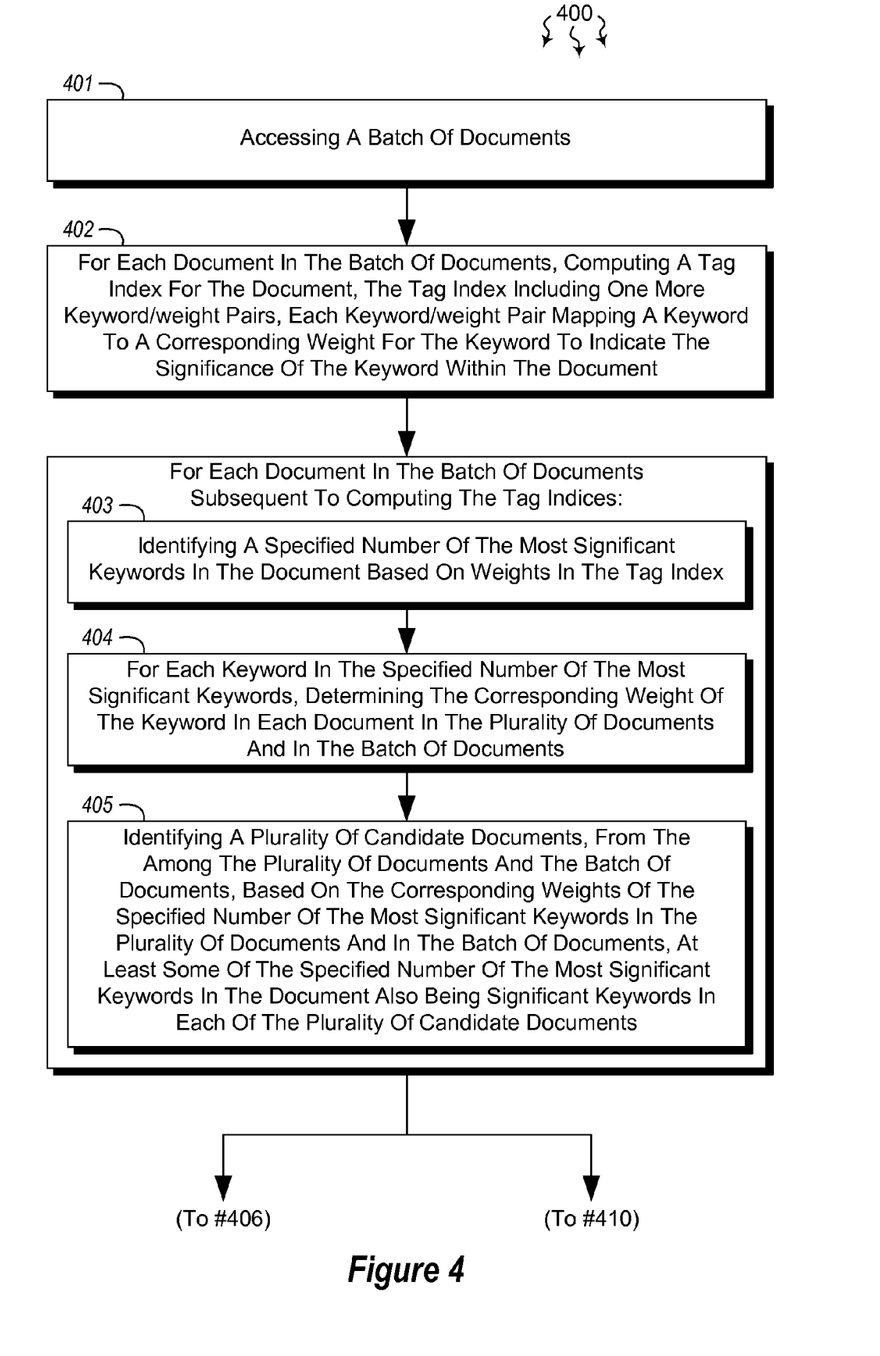
FIG. 4 illustrates a flow chart of an example method for updating a document similarity index.

FIG. 4 illustrates a flow chart of an example method 400 for updating a document similarity index. Method 400 will be described with respect to the components and data of computer architecture 300.

As depicted, tag index generator 301 can generate tag indices 319 for documents 311. For example, tag index 319A can correspond to document 311A, tag index 319B can correspond to document 311B, tag index 319C can correspond to document 311C, etc.

Method 400 includes an act of accessing a batch of documents (act 401). For example, tag index generator 401 can access document batch 312, including documents 312A, 312B, 312C, etc. For each document in the batch of documents, an act of computing a tag index for the document, the tag index including one more keyword/weight pairs, each keyword/weight pair mapping a keyword to a corresponding weight for the keyword to indicate the significance of the keyword within the document (act 402). Tag index generator 301 can generate tag indices 364 for document batch 312. For example, tag index generator 301 can generate tag index 313 for document 312A, tag index 393 for document 312B, etc. For example, tag index 313 includes keyword/weight pairs, such as, for example keyword 314A/weight 314B, keyword 316A/weights 316B, etc, indicating the significance of each keyword 314A, keyword 314B, etc. within document 312A. Similarly, tag index 393 includes keyword/weight pairs, such as, for example keyword 394A/weight 394B, keyword 396A/weights 396B, etc, indicating the significance of each keyword 394A, keyword 394B, etc. within document 312B. Tag index 397 can be a similarly formatted tag index for some other document in document batch 312.

Method 400 includes for each document in the batch of documents subsequent to computing the tag indices, an act of identifying a specified number of the most significant keywords in the document based on weights in the tag index (act 403). For example, keyword selector 302 can access tag index 313. Keyword selector 302 can identify significant keywords 317 contained in document 112 (including keywords 114A, 116A, and 118A) based on weights in tag index 313. For example, weights 314B, 316B, etc. can indicate that keywords 314A, 316A, etc. are more significant in document 312. Keyword selector 302 can be configured to select a specified number of (e.g., a top ten) significant keywords from a document.

Method 400 includes for each keyword in the specified number of the most significant keywords, an act of determining the corresponding weight of the keyword in each document in the plurality of documents and in the batch of documents (act 404). Candidate document identifier 303 can receive significant keywords 317, tag indices 364 (for document batch 312), and tag indices 319 (for documents 311). Each tag index in tag indices 364 can corresponding to a document in document batch 312, For example, tag index 393 can correspond to document 312B. Each tag index in tag indices 319 can correspond to a document in documents 311. For example, tag index 319A corresponds to document 311A, tag index 319B corresponds to document 311B, tag index 319C corresponds to document 311C, etc.

For each keyword in significant keywords 317, candidate document identifier 303 can scan tag indices 364 (tag index 313 can be ignored) and tag indices 319 for the keyword. For any tag indices that include the keyword, the weight of the keyword within the corresponding document can be temporarily saved. For example, if keyword 314A is found in tag index 319A, the weight for the keyword 314A within document 311A can be temporarily saved. Similarly, if keyword 316A is found in tag index 393, the weight of keyword 316A within document 312B can be temporarily saved.

Method 400 includes an act of identifying a plurality of candidate documents, from the among the plurality of documents and the batch of documents, based on the corresponding weights of the specified number of the most significant keywords in the plurality of documents and in the batch of documents, at least some of the specified number of the most significant keywords in the document also being significant keywords in each of the plurality of candidate documents (act 405). Candidate document identifier 303 can identify documents (from document batch 312 and documents 312) corresponding tag indices 321 (a subset of tag indices 364 and 319) as candidate documents that are potentially similar to document 312A.

For example, candidate document identifier 303 can identify document 311A corresponding to tag index 319A as potentially similar to document 112. Similarly, candidate document identifier 303 can identify document 311C corresponding to tag index 319C as potentially similar to document 112. Likewise, candidate document identifier 303 can identify document 312B corresponding to tag index 393 as potentially similar to document 312A. At least some of significant keywords 317 are also included in each of the candidate documents, 111A, 111C, 112B, etc. To identify candidate documents that are potentially similar to document 312A, keyword comparator 304 can compare the keyword weights for each keyword found in each document to one another.

Document location detector 309 can access tag indices 321 and detect whether a document corresponding to tag index is located in documents 311 or is located in document batch 312. Document location detector can separate tag indices for candidate documents in documents 311 and tag indices for candidate documents in document batch 312. Tag indices 331 include tag indices, for example, 393, 397, etc., corresponding to documents in document batch 312. Tag indices 332 include tag indices, for example, 319, 319A, etc., corresponding to documents in documents 311

Method 400 includes for any candidate documents identified from within the plurality of documents, an act of calculating a full similarity between the document and candidate document by determining the weight of additional keywords from the document within the candidate document (act 406). For example, full similarity calculator 302 can access tag index 313 and tag indices 332. Full similarity calculator 302 can calculate full similarities 334. Full similarities 334 can indicate a full similarity between document 312A and each document corresponding to a tag index in tag indices 332.

For example, full similarities 334 can indicate a full similarity between document 312A and document 311A based on keywords (in addition to significant keywords 317) and weights in tag indices 313 and 319A. Likewise, full similarities 334 can indicate a full similarity between document 312A and document 311C based on keywords (in addition to significant keywords 317) and weights in tag indices 313 and 319C. Full similarities between document 312A and other documents in documents 311 can also be indicated based on keywords and weights tag index 113 and other corresponding tag indices.

Turning to the continuation sheet of FIG. 3, in some embodiments, document similarities are represented by a similarity value connecting two documents. For example, within full similarities 334, similarity value 372 represents the similarity between document 312A and document 311C. Similarly, within document similarity index 327, similarity value 371 represents the similarity between document 361 (some other document) and document 311C.

Method 400 includes an act of identifying the weakest similarity, from among a specified number of top similarities, for the candidate document from within the document similarity index, the weakest similarity indicating the similarity between the candidate document and another document in the plurality of documents (act 407). For example, similarity comparator 374 can access a specified top number of similarities for document 311C from within document similarity index 327. The specified top number of similarities represents similarities between document 311C and other documents.

Similarity comparator 374 can compare the specified top number of similarities to one another to identify the weakest similarity (e.g., by value) within the specified top number of similarities. For example, similarity comparator 374 can identify the similarity between document 361 and document 311C as the weakest top similarity for document 311C based on similarity value 371. As such, similarity comparator 374 can view the similarity between document 361 and document 311C as a candidate for replacement within document similarity index 327.

Similarity comparator 374 can also access full similarities 334. Similarity comparator can be compare similarity value 372 to similarity value 371 to determine id document 311C is more similar to document 312A or more similar to document 361.

Method 400 includes an act of determining that the candidate document and the document are more similar than the candidate document and the other document by comparing the calculated full similarity to the identified weakest similarity (act 408). For example, based on similarity values 371 and 372, similarity comparator 374 can determine that documents 312A and 311C are more similar that documents 361 and 311C. Method 400 includes an act of replacing the weakest similarly with information from the calculated full similarity within the document similarity index, the replacement based on the determination (act 409). For example, information from full similarity between document 312A and document 311C can replace the similarity between document 311C and document 361 within document similarity index 327. As such, document similarity index 327 is incrementally updated as similarities based on more recently received documents are detected to be greater than similarities between existing documents (without having to completely recreate document similarity index 327)

Alternately, based on similarity values 371 and 372, similarity comparator 374 can determine that documents 361 and 311C are more similar that documents 312A and 311C. As such, the similarity between document 361 and document 311C is retained in document similarity index 327.

Method 400 includes for any candidate documents identified from within the batch of documents, an act of calculating a full similarity between the document and candidate document by determining the weight of additional keywords from the document within the candidate document (act 410). Returning back to FIG. 3, full similarity calculator 302 can access tag index 313 and tag indices 331. Full similarity calculator 302 can calculate full similarities 333. Full similarities 333 can indicate a full similarity between document 312A and each document corresponding to a tag index in tag indices 331.

For example, full similarities 333 can indicate a full similarity between document 312A and document 312B based on keywords (in addition to significant keywords 317) and weights in tag indices 313 and 393. Likewise, full similarities 333 can indicate a full similarity between document 312A and another document in document batch 312 based on keywords (in addition to significant keywords 317) and weights in tag indices 313 and 397. Full similarities between document 312A and other documents in document batch 312 can also be indicated based on keywords and weights tag index 113 and other corresponding tag indices.

Method 400 includes an act of selecting a prescribed number of candidate documents for inclusion in the document similarity index as documents that are similar to the document, selection of the prescribed number of candidate documents based on the full similarity calculations and in accordance with one of a hard limit or an express threshold, the hard limit or the express threshold limiting the number of candidate documents that can be selected for inclusion in the document similarity index (act 411). Turning again to the continuation sheet of FIG. 3, candidate document selector 307 can select prescribed full similarities 326 for inclusion in document similarity index 327. Prescribed similarities 326 includes full similarities between document 312A and a reduced subset of candidate documents represented in full similarities 333. Candidate document selector 307 can select prescribed full similarities 326 based on full similarities 333 and in accordance with hard limits or express thresholds in candidate selection rules 324. The hard limits or express thresholds limit the number of full similarities from full similarities 333 the can be included in prescribed full similarities 326.

Method 300 includes an act of storing information from the calculated full similarity between the document and the candidate document in the document similarly index (act 411). For example, for each candidate document represented in prescribed full similarities 326, information from the similarity between document 312A and the candidate document can be stored in document similarity index 327. For example, information from tag index 313 and tag index 393 can be stored in document similarity index 327 to indicate that documents 312A and 312B are similar.

In some embodiments, tag indices include a list of tags and corresponding weights for each, such as, for example:

Doc1: {(tag11, weight11), (tag12, weight12), . . . , (tag1k, weight1k)}
Doc2: {(tag21, weight21), (tag22, weight22), . . . , (tag2k, weight2k)}

Thus, documents can be viewed as vectors in a tags space (each tag being a different dimension and each weight being a value in the corresponding dimension). Accordingly, a cosine-similarity function (for computing vector differences) can be used to compute the similarity between two documents. For example:

$$CosineSimilarity(doc1,doc2)=Dotproduct(doc1,doc2)/(Norm(doc1)*Norm(doc2))$$

Where:
Dotproduct(doc1, doc2)=Sum(Weight(tag, doc1)*Weight(tag,doc2)|for each tag that is common to doc1 and doc2)
and
Norm(doc)=Sqrt(Sum(Weight(tag, doc1)^2|for each tag in doc)

An example physical data layout of the tag index can be as follows:

```
CREATE TABLE sys.tag_index AS (
doc_id          BIGINT,
phrase_id       BIGINT ,
weight          DOUBLE,
PRIMAY KEY(doc_id, phrase_id) )
CREATE INDEX tag_index_phrase_id on tag_index(phrase_id, doc_id)
CREATE INDEX doc_index_phrase_id on tag_index(doc_id)
```

Accordingly, the following algorithm can be used to derive a document similarity index:

```
For each unprocessed docID
    // find topK1 candidates
    topK1Candidates = SelectSimilarityCandidates(TI, docId)
    // compute similarities relative to candidates
    resultsHeap = empty heap of max size topK
    For each candidateDocId in topK1Candidates:
        similarity = CosineSimilarity(TI, docId, candidateDocId)
        resultsHeap.Add(candidateDocId, similarity)
    End For
    // select topK results
    For each (candidateDocId, similarity) in resultsHeap
        write (docId, candidateDocId, similarity) to DSI table
    End For
End For
``` wherein the SelectSimilarityCandidates function is:

```
SelectSimilarityCandidates(TI, docId):
resultsSet = empty Map<int, double> // maps doc ids to value as candidate
For each (tag, weight1) in TI[docId]
    For each (candidateDocId, weight2) in (select topK1 docs from TI[tag])
        If (resultSet not contains (candidateDocId))
            resultSet.Add(candidateDocId, 0)
        End If
        resultSet[candidateDocId] += weight1*weight2;
    End For
End For
return topK items in resultsSet
```

To "select topK1 docs from TI[tag]", all documents with a given tag can be found in descending order of weight so that the top K can be selected. A least recently used ("LRU") cache can be used on tag index rows to increase the efficiency of selecting the Top K (at least in part because the operation can be repeated many times, such as, for a popular tag when processing the similarity of a corpus of documents). Individual (tag, document Id, weight) triples corresponding to a row can be stored in the cache. The following example interface can be used:

```
class TILookupKey
{
    string  m_tag
    float   m_previousEntryWeight
    long    m_previousEntryDocid
}
class TIEntry
{
    TILookupKey m_key;
    float   m_weight
    long    m_docid
}
// Given the previous entry for a tag look-up, find the next one.
//
TIEntry     GetNextEntry(TIEntry previous)
```

Using example interface, a document similarity index build algorithm can call GetNextEntry( . . . ) until it has the set of the set of desired docids. Look-up in the cache can be keyed based the previous entries weight/docid. If the next entry isn't present in the cache we can use the previous entry to look it up on disk (i.e., look-up the next entry sorted based on weight using the appropriate index on the tag index system table). The entry can then be cached. The same LRU cache (with a different look-up key) can also be used to look-up tags sorted by weight for a given document by storing the previous tag Document similarities for different docids can be processed on different threads to parallelize a document similarity build algorithm (i.e., The outer "For each unprocessed docId" loop can be split among many threads). As such, the LRUcache can use an approximation by picking a random sample of cached entries (e.g., to mitigate the impact of concurrency requirements on the cache that can make using true LRU resource intensive). Using that sample, a LRU cut off can be determined. The LRU cut off can be used to set a specified percentage (e.g., 25%) of entries as older than the LRU cut off. When the cache is full a clock hand runs over the cache and evicts entries whose LRU value is lower than the pre-calculated LRU cut off to keep the cache under its maximum size. Once the clock hand has made a sweep over the entire cache, the LRU cut-off is recalculated. Thus, the approximation can be done with minimal locking, promoting efficiency for caches within increasing numbers of inserts/lookups.

Embodiments of the invention include scalable and efficient mechanisms for deriving and updating a document similarity indexes for a plurality of documents. The number of maintained similarities can be controlled to reduce $N^2$ CPU and storage requirements.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   at least one processor; and
   one or more storage device having stored computer-executable instructions which, when executed by the at least one processor, implement a method for deriving a document similarity index for a plurality of documents, the method comprising:
   an act of accessing a document;
   an act of computing a tag index for the document, the tag index including one more keyword/weight pairs, each keyword/weight pair mapping a keyword to a corresponding weight for the keyword to indicate a significance of the keyword within the document;
   an act of identifying a specified number of most significant keywords in the document based on weights in the tag index;
   for at least one keyword in the specified number of the most significant keywords, an act of determining the corresponding weight of the at least one keyword in each document in the plurality of documents;
   an act of identifying a plurality of candidate documents, from the among the plurality of documents, based on the corresponding weights of the specified number of the most significant keywords in the plurality of documents, at least some of the specified number of the most significant keywords in the document also being significant keywords in each of the plurality of candidate documents;
   for each candidate document in the plurality of candidate documents, an act of calculating a full similarity between the document and candidate document by determining the weight of additional keywords from the document within the candidate document; and
   an act of selecting full similarities for one or more candidate documents for inclusion in the document similarity index to indicate documents that are similar to the document, selection of the full similarities for the one or more candidate documents being based on at least the full similarity calculations.

2. The computing system of claim 1, wherein the method further includes:
   for each candidate document included in the prescribed number of candidate documents, an act of providing information from the full similarity between the document and the candidate document for inclusion in the document similarly index.

3. The computing system of claim 1, wherein the method further includes:
   for each candidate document included in the prescribed number of candidate documents, an act of storing information from the full similarity between the document and the candidate document in the document similarly index.

4. The computing system as recited in claim 1, wherein an act computing a tag index for the document comprises computing keyword weights based on keyword frequency within the document and document length.

5. The computing system as recited in claim 1, wherein the act of identifying a plurality of candidate documents, from the among the plurality of documents, based on the corresponding weights of the specified number of the most significant keywords in the plurality of documents comprises an act of accessing at least one keyword/weight pair form a least recently used ("LRU") cache.

6. The computing system as recited in claim 1, wherein for each candidate document in the plurality of candidate documents, the act of calculating a full similarity between the document and candidate document comprises an act of using a cosine-similarity function to calculate the similarity between the document and the candidate document.

7. The computing system as recited in claim 1, wherein an act of selecting full similarities includes selecting only a prescribed number of candidate documents for inclusion in the document similarity index in accordance with one of a hard limit or an express threshold, the hard limit or the express threshold limiting the number of candidate documents that can be selected for inclusion in the document similarity index.

8. The computing system as recited in claim 3, wherein for each candidate document included in the prescribed number of candidate documents, the act of storing information from the full similarity in the document similarly index comprises an act of storing a mapping that quantifies the similarity between the document and the candidate document in a similarity value.

9. A computing system comprising:
   at least one processor; and
   one or more storage device having stored computer-executable instructions which, when executed by the at least one processor, implement a method for updating a document similarity index, wherein the computer system has access to plurality of documents and the document similarity index, the document similarity index indicating similarities between different documents in the plurality of documents, the method comprising:
      an act of accessing a batch of documents;
         for each document in the batch of documents, an act of computing a tag index for the document, the tag index including one more keyword/weight pairs, each keyword/weight pair mapping a keyword to a corresponding weight for keyword to indicate a significance of the keyword within the document;
         for each document in the batch of documents subsequent to computing the tag indices:
            an act of identifying a specified number of the most significant keywords in the document based on weights in the tag index;
            for each keyword in the specified number of most significant keywords, an act of determining the corresponding weight of the keyword in each document in the plurality of documents and in the batch of documents;
            an act of identifying a plurality of candidate documents, from the among the plurality of documents and the batch of documents, based on the corresponding weights of the specified number of the most significant keywords in the plurality of documents and in the batch of documents, at least some of the specified number of the most significant keywords in the document also being significant keywords in each of the plurality of candidate documents;
            for at least one candidate document identified from within the plurality of documents:
               an act of calculating a full similarity between the document and candidate document by determining the weight of additional keywords from the document within the candidate document;
               an act of identifying a weakest similarity, from among a specified number of top similarities, for the candidate document from within a document similarity index, the weakest similarity indicating the similarity between the candidate document and another document in the plurality of documents;
               an act of determining that the candidate document and the document are more similar than the candidate document and the other document by comparing the calculated full similarity to the identified weakest similarity; and
               an act of replacing the weakest similarly with information from the calculated full similarity within the document similarity index to incrementally update the document similarity index, the replacement based on the determination.

10. The computing system as recited in claim 9, wherein the method further comprises for at least one other candidate document identified from within the plurality of documents:
   an act of calculating a full similarity between the document and candidate document by determining the weight of additional keywords from the document within the candidate document;
   an act of identifying the weakest similarity, from among a specified number of top similarities, for the candidate document from within the document similarity index, the weakest similarity indicating the similarity between the candidate document and a second other document in the plurality of documents;
   an act of determining that the candidate document and the second other document are more similar than the candidate document and the document by comparing the calculated full similarity to the identified weakest similarity; and
   an act of retaining the weakest similarity with within the document similarity index based on the determination.

11. The computing system as recited in claim 9, wherein for each document in the batch of documents, the act of computing a tag index for the document comprises an act of computing keyword weights based on keyword frequency within the document and document length.

12. The computing system as recited in claim 9, wherein the act of replacing the weakest similarly with information from the calculated full similarity within the document similarity index comprises an act of overwriting a similarity value that quantifies the similarity between the candidate document and the other document with a similarity value that quantifies the similarity between the candidate document and the document.

13. A computing system comprising:
   at least one processor; and
   one or more storage device having stored computer-executable instructions which, when executed by the at least one processor, implement a method for updating a document similarity index, wherein the computer system has access to plurality of documents and the document similarity index, the document similarity index indicating similarities between different documents in the plurality of documents, the method comprising:
an act of accessing a batch of documents;
   for each document in the batch of documents, an act of computing a tag index for the document, the tag index including one more keyword/weight pairs, each keyword/weight pair mapping a keyword to a corresponding weight for keyword to indicate a significance of the keyword within the document;

for each document in the batch of documents subsequent to computing the tag indices:
  an act of identifying a specified number of the most significant keywords in the document based on weights in the tag index;
  for each keyword in the specified number of most significant keywords, an act of determining the corresponding weight of the keyword in each document in the plurality of documents and in the batch of documents;
  an act of identifying a plurality of candidate documents, from the among the plurality of documents and the batch of documents, based on the corresponding weights of the specified number of the most significant keywords in the plurality of documents and in the batch of documents, at least some of the specified number of the most significant keywords in the document also being significant keywords in each of the plurality of candidate documents; and
  for any candidate documents identified from within the batch of documents:
    an act of calculating a full similarity between the document and candidate document by determining the weight of additional keywords from the document within the candidate document;
    an act of selecting a prescribed number of candidate documents for inclusion in the document similarity index as documents that are similar to the document, selection of the prescribed number of candidate documents based on the full similarity calculations and in accordance with one of a hard limit or an express threshold, the hard limit or the express threshold limiting the number of candidate documents that can be selected for inclusion in the document similarity index; and
    an act of providing information from the calculated full similarity between the document and the candidate document to the document similarly index.

14. The computing system as recited in claim 13, wherein for each document in the batch of documents, the act of computing a tag index for the document comprises an act of computing keyword weights based on keyword frequency within the document and document length.

15. The computing system as recited in claim 13, wherein the act of replacing the weakest similarly with information from the calculated full similarity within the document similarity index comprises an act of overwriting a similarity value that quantifies the similarity between the candidate document and the other document with a similarity value that quantifies the similarity between the candidate document and the document.

16. The computing system as recited in claim 13, wherein for any candidate documents identified from within the batch of documents, the act of calculating a full similarity between the document and candidate document comprises an act of using a cosine-similarity function to calculate the similarity between the document and the candidate document.

17. The computing system as recited in claim 16, wherein selecting full similarities for a prescribed number of a candidate documents for inclusion in the document similarity index comprises an act of selecting full similarities for a prescribed number of a candidate documents in accordance with a hard limit that limits the number of similarities that can be selected for inclusion in the document similarity index to ten or less.

18. The computing system of claim 17, wherein the method further includes:
  for each candidate document included in the prescribed number of candidate documents, an act of storing information from the full similarity between the document and the candidate document for inclusion in the document similarly index.

19. The computing system as recited in claim 18, wherein the act of storing information from the full similarity in the document similarly index comprises an act of storing a mapping that quantifies the similarity between the document and the candidate document in a similarity value.

20. The computing system as recited in claim 19, wherein for at least one candidate document identified from within the plurality of documents, the act determining that the candidate document and the document are more similar than the candidate document and the other document by comparing the calculated full similarity to the identified weakest similarity comprises an act of comparing a first similarity value quantifying the similarity candidate document and the document to a second similarity value quantifying the similarity candidate document and the other document.

* * * * *